July 30, 1946.  R. W. McLAREN  2,404,858
JIG
Filed Feb. 18, 1943  2 Sheets-Sheet 1
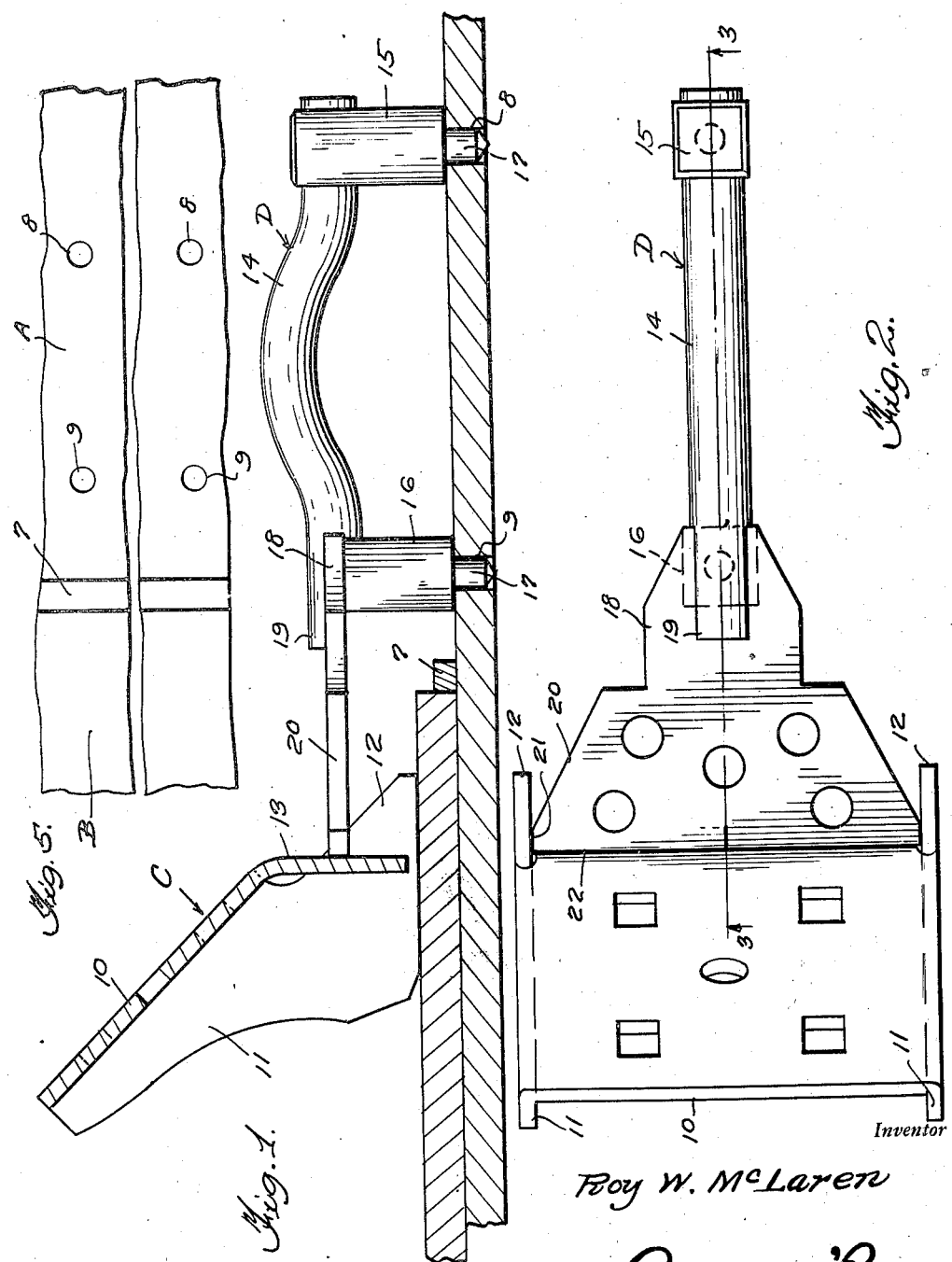
Inventor
Roy W. McLaren
By Clarence A. O'Brien
and Harvey B. Jacobson
Attorneys July 30, 1946.  R. W. McLAREN  2,404,858
JIG
Filed Feb. 18, 1943  2 Sheets-Sheet 2
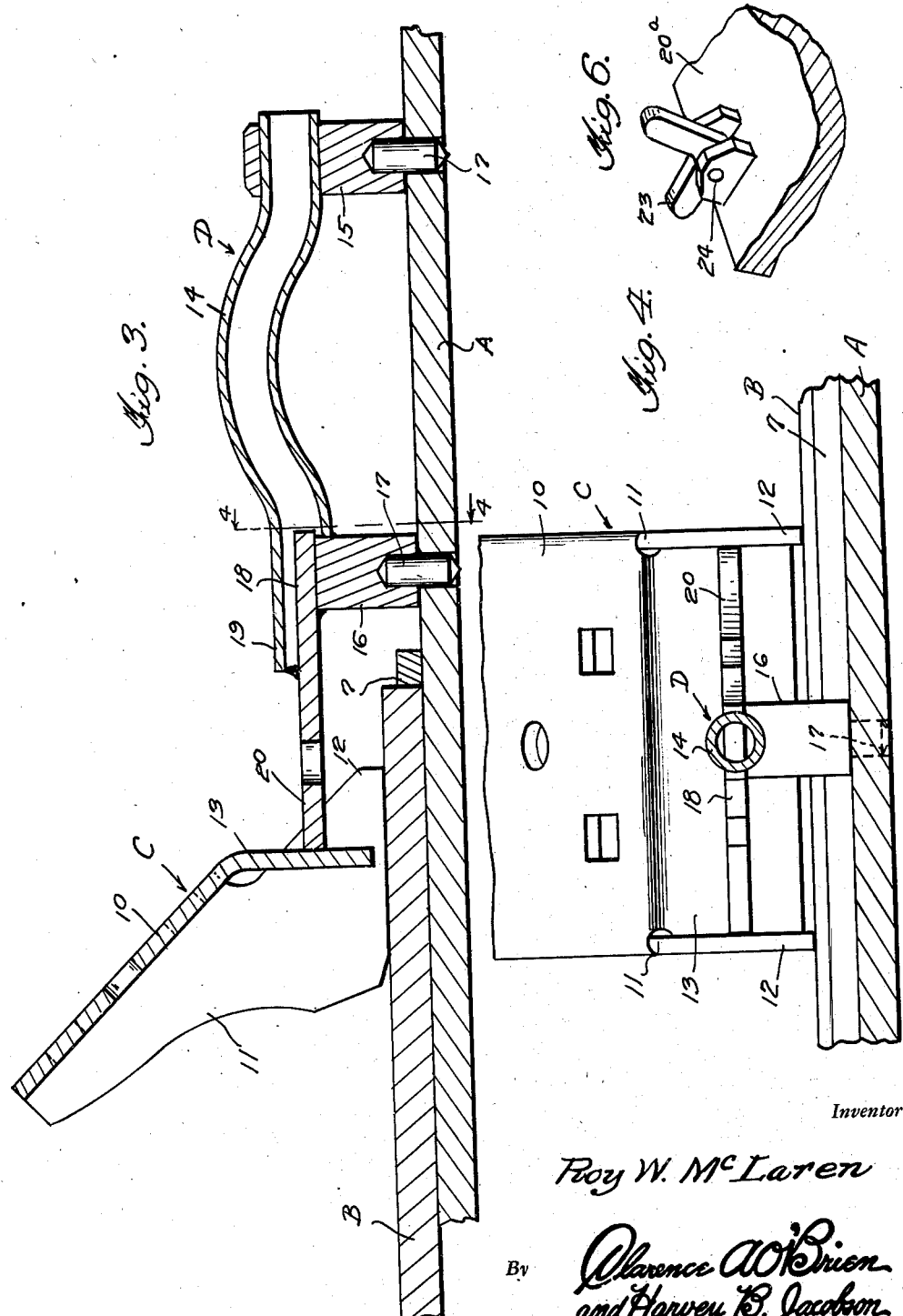
Inventor
Roy W. McLaren
By Clarence A. O'Brien
and Harvey B. Jacobson
Attorneys Patented July 30, 1946

2,404,858

UNITED STATES PATENT OFFICE 2,404,858

JIG

Roy W. McLaren, Oaklyn, N. J.; Helen H. McLaren, administratrix of said Roy M. McLaren, deceased, assignor to Helen McLaren, Oaklyn, Camden, N. J.

Application February 18, 1943, Serial No. 476,317

4 Claims. (Cl. 33—180)

The present invention relates to ways and means of positioning and mounting special welding brackets on plate members, and has more specific reference to a novel standardized jig and the method and means for properly and expeditiously using the same.

In order to pave the way for a ready and comprehensive understanding of the invention forming the subject matter of this application, it is deemed advisable, at the outset, to explain the background of the case and, in so doing, to make cross reference to copending applications with which the herein covered means and jig structure are closely allied and conjointly used. To this end, I think it advisable to first direct attention to the adoption and current usage of a special fixture or bracket forming the essence of the subject matter of a copending application identified as Serial No. 466,817, filed by me in the United States Patent Office under date of November 24, 1942.

These special brackets are being effectively and conveniently employed for use on ships or structural steel buildings where welding is the main permanent connecting medium between the ship or plate members. Each bracket, which is more or less incidentally herein shown and described, is such as to embody what is known as an assembling and aligning abutment to adapt such brackets, when used in pairs, for employment in a method for assembling the complemental plate members. In said method there is involved the step of tack-welding a pair of duplicate companion assembling and holding brackets to predetermined points or places on the plate members; secondly, the bringing of the coacting surfaces of the matchable palm or abutment portions into shiftable contact and then inserting a drift pin, that is, a drift pin of a predetermined style, this being hammered into place through apertures in the abutting portions to locate these portions in predetermined relation and to hold the plate members accurately assembled for the permanent welding operation.

The aforementioned brackets or fasteners are purposely made universal in design so that there are neither rights nor lefts, and so that they can be quickly selected and used. Now, a jigging tool and special method invoking the use of said tool are used for accurately locating these brackets on the structure.

There are varied forms of fastener brackets used in shipbuilding methods, such as are pursued in accordance with my ideas. Thus, and by way of further cross reference, I would call attention to copending application, Serial No. 476,449, filed by me in the United States Patent Office, under date of February 19, 1943. The latter brackets are more nearly of the type explicitly shown in the drawings of this application, which constructions will become apparent from the succeeding description and illustrative drawings.

Coming now to the subject matter of this instant application and the invention disclosed herein, novelty is thought to reside in the method phase on the one hand, and secondly in the specific constructional arrangements, particularly the jigging tool per se. Thus, claims are predicated on the structural parts in combination, the procedural steps, and the tool per se.

Other features and advantages of the invention will become more readily apparent from the following description and the accompanying illustrative drawings.

In the drawings, like numerals designate like parts throughout the views, this procedure and description being followed to promote clarity in quickly referring to the parts and elements.

Referring to the drawings:

Figure 1 is a view partly in elevation and partly in section showing the bed or platen of the subassembly, the work superimposed thereon, a fastener bracket on the work, and the novel jigging tool coordinated with these several parts.

Figure 2 is a top plan view of the tool to bring out the construction of the adapter head and its closely coordinated association with coacting features of the fastener bracket.

Figure 3 is a longitudinal section on the plane of the line 3—3 of Figure 2 with the parts of the tool in section.

Figure 4 is a vertical section taken on the plane of the line 4—4 of Figure 3 looking in the direction of the arrows.

Figure 5 is a fragmentary plan view showing portions of the sub-assembly or platen with the jig tool accommodation holes in predetermined position for expeditious multiple tool usage.

Figure 6 is a fragmentary perspective showing a modification in the formation of the adapter head of the jig tool.

Referring now to the drawings by distinguishing reference numerals, it will be noted that the base or platen is denoted by the reference character A, the ship plate by the character B, and the special fastener bracket by the character C. The jig tool, as a unit, is differentiated by the reference character D.

In practice the plate A is provided adjacent one edge with a suitably scribed mark or, in some instances, with a runner 7 serving as a shoulder or stop, one edge of the work plate B being forced thereagainst to overlie or overlap the platen, as shown in Figures 1, 3 and 4. At predetermined points to the right of the shoulder 7, I provide sockets or holes 8 and 9. These are definite distances apart and in alignment, and the pairs are also in alignment running lengthwise of the platen. They are very accurately placed in reference to the shoulder 7 to accommodate and permit removable application of the jigging tool. In practice, any number of tools, standardized in form, will be used, all depending on the number of brackets C to be tack-welded to the plate B.

The fastener bracket C, which is the subject of a copending application, identified as Serial No. 476,449 comprises an assembling, aligning and fastening abutment 10 with reinforcing and attaching flanges 11. The lower portions of the flanges are especially designed for tack-welding, and the projecting toes 12 extend beyond the apron-like jig adapter palm or abutment 13. Thus, a pocket exists between the abutment 13 and the projecting extension 12.

The tool D is characterized by a handle 14 which is preferably tubular in form with its central portion appropriately shaped for convenient handling. The one end thereof is fixedly mounted in a post 15 paired up with a similar and shorter post 16. Now, the lower ends of these posts are formed with central sockets to accommodate double-pointed anchoring and retention pins 17. The lower projecting and pointed ends of the pins are adapted to drop into the sockets or holes 8 and 9, as is evident, the lower ends of said posts resting firmly on the areas of the platen surrounding the holes 8 and 9. The positioning head is somewhat dovetailed in general configuration, the shank portion 18 being fastened down on the upper end of the post 16, and there being a portion of the handle extended, as at 19, to overlie said shank. This provides for convenient manufacturing and assembling of the parts. Now, the head proper 20 has its edge portions squared off, as at 21, and its edge 22 straight across to intimately contact the apron-like abutment 13. Thus, this especially shaped head 20 slips to the aforementioned pocket so that by pushing the bracket C up in place and registering the parts as shown, the bracket is in the exact position desired for tack-welding on the work plate B.

Reference being had now to Figure 6, this discloses a modification in which the head 20a is provided with an L-shaped latch 23 pivoted in place, as at 24. This particular latch arrangement is useful when the abutment 13 is provided with a central vertically disposed accommodation slot (not shown), that is to say, in certain of the brackets the part 13 has a slot and one finger of the latch projects into this to temporarily couple the bracket C to the jigging tool.

It is quite evident that the location and use of a multiplicity of automatic fastener brackets or fixtures for aligning and assembling on heavy plates is quite a task when it is considered that the opposed pairs of brackets on the complemental plates should be in exactly the same relative spots or positions. Considerable pre-measuring and a scribing would, ordinarily, be necessary. However, in adapting the present method and in designing this jigging tool, I have primarily intended to accomplish satisfactory ways and means of rapidly and accurately locating and then positioning the fastener brackets on the work plate, this without measuring distances or projecting lines. It is indeed practicable to have a simple platen with the pairs of selectively usable holes to accommodate the jigs and to place the headed portions of the jigs over the adjacent edge portions of the work plate to thus mark the very spot at which the brackets are to be placed. It then becomes easy to slip said brackets up in place and to locate the same against the heads of jigs and then tack-weld the same.

Briefly, all that is necessary is to put the jigs in the holes 8 and 9, place the work plate B in position on the platen, shove the brackets up in place, and weld. Evidently, this method and means is unique and is surely aptly fitted for the purposes and results intended.

While the possibilities, features and advantages of this invention could be expounded considerably, it is believed that the drawings and description thus far considered are sufficient to enable persons skilled in the art to comprehend the range of inventive effort. Therefore, a more lengthy description is deemed unnecessary.

I claim:

1. A jigging tool of the class described comprising a handle, posts at opposite ends of the handle, said posts having pins adapted for reception in sockets in a platen, a special bracket adapter head mounted on and projecting beyond one end of the handle adapted for coaction with a fastener bracket, said head being dovetailed in top plan view.

2. An especially constructed jigging tool for accurately locating and temporarily holding especially constructed welding brackets at predetermined tack welding spots on a work plate in a manner to obviate the necessity of measuring distances and projecting lines on such work plate comprising a horizontal handle, right angularly disposed posts attached thereto, said posts having pins for removable reception in sockets in a work plate accommodating platen, and a special bracket adapter head disposed at one end and projecting beyond said end of the handle and adapted for coaction with a predetermined portion of the welding bracket in the manner and for the purposes described.

3. A jigging tool for accurately locating and temporarily holding a fastener bracket until welded at a predetermined tack-welding spot on a work plate in a manner to obviate the necessity of measuring distances and projecting lines on such work plate, said bracket having, at a predetermined point, a tool adapter and accommodation pocket, said tool comprising a horizontally disposable handle, right angularly disposed depending handle attaching, supporting and retaining elements carried by said handle, said elements being adapted for detachable connection with predetermined portions of platen underlying said handle, and a bracket locating and holding head disposed at one end and projecting beyond said end of the handle for reception in the adapter pocket.

4. A jigging tool for locating and temporarily holding a fastener bracket at a predetermined tack-welding spot on a work plate, this in a manner to obviate the necessity of measuring distances and projecting lines on such work plate, said bracket being provided with a receptacle-like adapter pocket for coaction with the adjacent end of the tool, said tool comprising a horizontal handle, means for detachably fastening the handle temporarily to an underlying platen to hold the handle at a predetermined place on said platen in relation to the bracket and work plate, and means at that end of the handle adjacent said bracket projecting beyond the handle and adapted for disposition in said pocket.

ROY W. McLAREN.